United States Patent [19]

Kishi et al.

[11] Patent Number: 4,751,595
[45] Date of Patent: Jun. 14, 1988

[54] DISK DRIVE UNIT WITH POWER-OFF HEAD PARKING AND LOCKING MECHANISM

[75] Inventors: Toru Kishi, Zama; Takashi Saito, Ayase, both of Japan

[73] Assignee: Victor Company of Japan, Ltd., Japan

[21] Appl. No.: 775,303

[22] Filed: Sep. 12, 1985

[30] Foreign Application Priority Data

Sep. 19, 1984 [JP] Japan .................... 59-141831[U]

[51] Int. Cl.⁴ .................... G11B 5/54; G11B 21/08
[52] U.S. Cl. .................... 360/105; 360/106; 360/75
[58] Field of Search .................... 360/105, 106, 75

[56] References Cited

U.S. PATENT DOCUMENTS

| | | | |
|---|---|---|---|
| 3,751,603 | 8/1973 | Prieur et al. | 360/105 |
| 4,139,874 | 2/1979 | Shiraishi | 360/105 X |
| 4,237,501 | 12/1980 | Barmache et al. | 360/105 X |
| 4,371,903 | 2/1983 | Lewis | 360/105 X |
| 4,562,500 | 12/1985 | Bygdnes | 360/105 |
| 4,594,627 | 6/1986 | Viskochil et al. | 360/105 |
| 4,654,735 | 3/1987 | Izraelev et al. | 360/105 X |
| 4,660,120 | 4/1987 | Manzke et al. | 360/105 X |

OTHER PUBLICATIONS

IBM-TDB—vol. 22, No. 4 (9/79) pp. 1594-1596, W. P. Quinlan, Magnetic Head Unload Mechanism.
IBM-TDB—vol. 20, No. 6 (11/77) pp. 2362-2363, J. D. Hall et al., Head Retraction Latch Mechanism.

*Primary Examiner*—Stuart N. Hecker
*Assistant Examiner*—Alyssa H. Bowler
*Attorney, Agent, or Firm*—Lowe, Price, LeBlanc, Becker & Shur

[57] ABSTRACT

A disk drive unit such as a magnetic disk drive unit has a read/write head for recording signals on and reproducing signals from an information storage disk, a motor energizable by a power supply for driving the read/write head in the radial direction of the information storage disk, an auxiliary head driver responsive to turning-off of the power supply for enabling the motor to drive the read/write head radially toward a non-recording area of the information storage disk, and a head locking mechanism responsive to turning-off of the power supply for locking the read/write head having reached the non-recording area.

3 Claims, 3 Drawing Sheets

DISK DRIVE UNIT WITH POWER-OFF HEAD PARKING AND LOCKING MECHANISM

BACKGROUND OF THE INVENTION

The present invention relates to a disk drive unit.

Various known disk drive units such as magnetic and optical disk drive units have read/write heads movable radially in sliding contact with information storage disks which rotate at high speed for recording signals on and reproducing signals from the information storage disks.

In some of the conventional disk drive units, the read/write heads are held in contact with information storage disks while the disks are at rest. When the disks are driven to rotate at high speed, the read/write heads are caused by an air flow generated by the high-speed rotation of the disk to float slightly from the surface of the disks. In the disk drive units of this design, the read/write head is supported on a thin cantilevered support known as the gimbal arm so as to be capable of floating under the force of the air flow.

The gimbal arm is elastically deformable quite easily. When the disk drive unit is vibrated or subject to an external shock, the gimbal arm easily flexes to allow the read/write head to hit the disk surface, thus damaging the disk surface and/or the head itself.

Most disk drive units employed as mass storage mediums are of the moving-head multiple-platter (MHMP) type in which a plurality of information storage disks are accommodated concentrically. The information storage disks contain servo infomration signals such as track information signals and synchronizing signals on equal angular positions. If one of the disks were replaced due for example to damage, then mutual synchronization would not be achieved during reproduction of stored signals from the disks.

SUMMARY OF THE INVENTION

It is an object of the present invention to provide a disk drive unit having a means for preventing read/write heads from damaging the signal recording areas of disks at the time the read/write heads are caused to hit the disks due to vibration and/or shock.

According to the present invention, there is provided a disk drive unit comprising a read/write head for recording signals on and reproducing signals from an information storage disk, a motor energizable by a power supply for driving the read/write head in the radial direction of the information storage disk, a first means responsive to turning-off of the power supply for enabling the motor to drive the read/write head radially toward a non-recording area of the information storage disk, and a second means responsive to turning-off of the power supply for locking the read/write head having reached the non-recording area.

BRIEF DESCRIPTION OF THE DRAWINGS

The present invention will be described in detail by way of illustrative example with reference to the accompanying drawings, in which.

DETAILED DESCRIPTION

The principles of the present invention may be incorporated in a magnetic disk drive unit, an optical disk drive unit, or any other disk drive units employing information storage disks. For illustrative purpose, however, a magnetic disk drive unit of the moving-head multiple-platter (MHMP) type will be described below.

Figure 1:
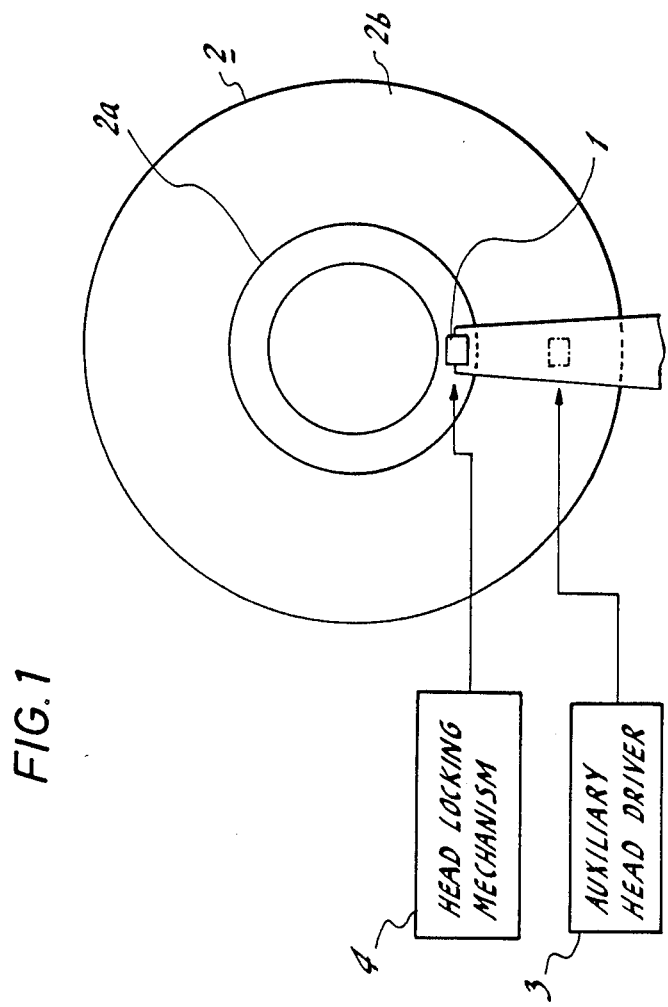
FIG. 1 is a schematic plan view showing the basic arrangement of a disk drive unit according to the present invention.

As illustrated in FIG. 1, the disk drive unit includes an auxiliary head driver 3 for driving each magnetic read/write head 1 toward the non-recording area 2a of one corresponding magnetic disk 2 in response to de-energization of the disk drive unit. The disk drive unit also includes a head locking mechanism 4 for locking the magnetic read/write head 1 having been moved to the non-recording area 2a against further movement. While the power supply of the disk drive unit is turned off, therefore, the magnetic read/write head 1 is locked in confronting relation to the non-recording area 2a, which is of an annular shape on the radially innermost marginal edge. Even if the magnetic head 1 and the magnetic disk 2 are caused to hit each other due to vibration of the disk drive unit or external shock imposed on the disk drive unit, the signal recording area 2b of the disk 2 is not damaged by the magnetic head 1.

Specific structural details of the disk drive unit according to the present invention will be described with reference to FIGS. 2 through 5.

Figure 2:
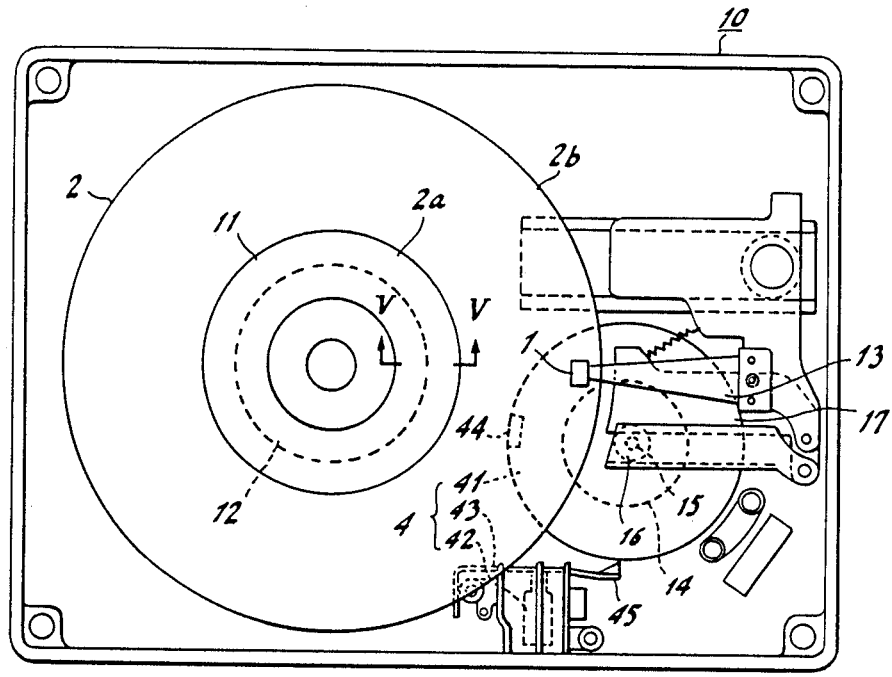
FIG. 2 is a plan view of a disk drive unit according to an embodiment of the present invention.

As shown in FIG. 2, the disk drive unit has a housing 10 containing a plurality of concentric magnetic disks 2 (only one shown) each supported by a disk holder 11 coupled to the rotatable shaft of a spindle motor 12 and rotatable thereby at a high speed. Signals can be recorded on and reproduced from the magnetic disks 11 by a plurality of respective magnetic read/write heads 1 (only one shown) which are connected by respective ginbal arms 13 (only one shown) to a linear head feed mecahnism.

The linear head feed mechanism basically comprises a pinion 16 fixedly mounted on the rotatable output shaft 15 of an access motor 14 in the form of a stepping motor, for example, and a rack 17 held in mesh with the pinion 16. The rotation of the access motor 14 is converted by the rack 17 and the pinion 16 to linear movement to move the magnetic read/write heads 1 linearly in the radial direction of the magnetic disks 2.

The magnetic heads 1 are connected through signal lines (not shown) to other devices for transmitting signals to and from these devices.

Figure 3:
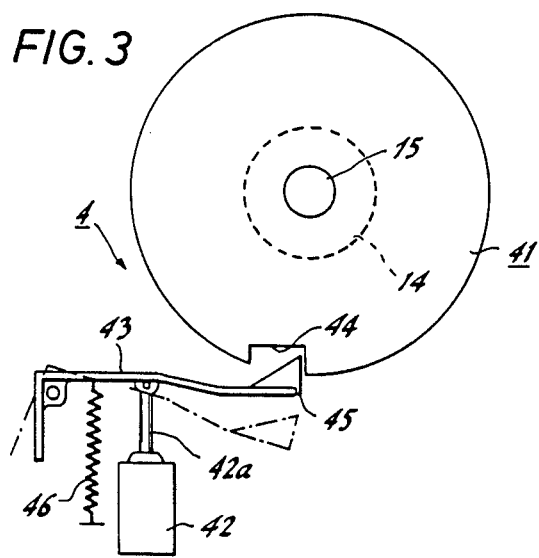
FIG. 3 is an enlarged plan view of a head locking mechanism incorporated in the disk drive unit shown in FIG. 2.

As shown in FIG. 3, the head locking mechanism 4 comprises a disk-shaped scale 41 attached to the rotatable shaft 15 of the access motor 14 and a locking lever 43 having one pivoted end and connected at its intermediate portion to a plunger 42a of a solenoid 42. The scale 41 has a rectangular recess 44 defined in an outer circumferential edge thereof. The locking lever 43 supports on its end opposite to the pivoted end a locking prong 45 engageable in the recess 44 in the scale 41. The locking lever 43 is normally urged by a compression coil spring 46 to turn counterclockwise (FIG. 3) about the pivoted end. When the solenoid 42 is de-energized, the locking lever 43 is angularly moved counterclockwise (FIG. 3) about its pivoted end under the force of the compression coil spring 46 to move the locking prong 45 into the recess 44 for locking the scale 41 against rotation. The access motor 14 is also locked at this time, and hence the magnetic heads 1 are also locked against movement in the radial direction of the respective magnetic disks 2.

The solenoid 42 remains energized when the power supply of the disk drive unit is turned on. With the solenoid 42 energized, the plunger 42a is withdrawn to turn the locking lever 43 clockwise to retract the locking prong 45 out of the recess 44, thus freeing the scale 41. When the power supply of the disk drive unit is turned off, the solenoid 42 is de-energized. The locking lever 43 is biased by the compression coil spring 46 toward the scale 41 to bring the locking prong 45 into the recess 44.

The locking prong 45 is triangular in shape when viewed in plan as shown in FIG. 3. When the locking prong 45 engages in the recess 44, the locking prong 45 locks the scale 41 against rotation in one direction while allowing the scale 41 to be rotated in the other direction (i.e., counterclockwise in FIG. 3).

Figure 4:
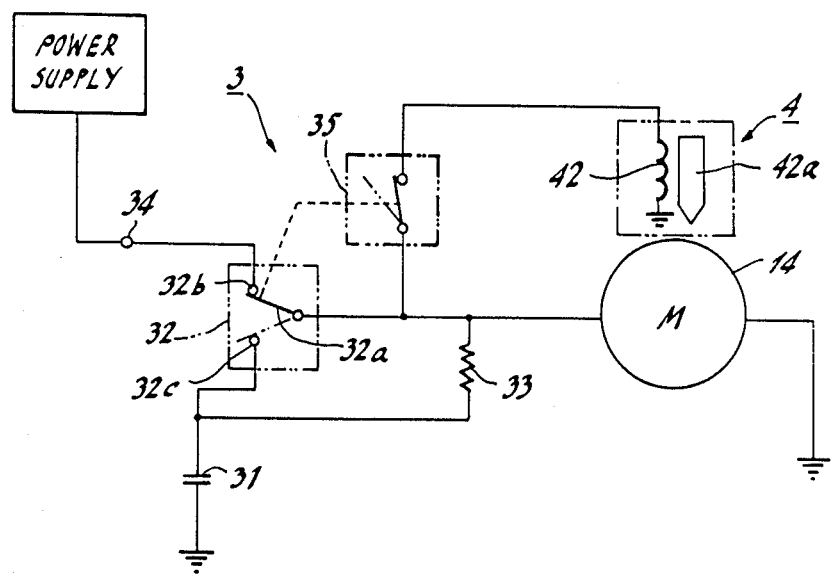
FIG. 4 is a circuit diagram of a control circuit for the head locking mechanism of FIG. 3.

As illustrated in FIG. 4, the auxiliary head driver 3 includes an electrolytic capacitor 31. When the power supply of the disk drive unit is turned off, the electrolytic capacitor 31 is discharged to energize the access motor 14 for moving the magnetic heads 1 toward the non-recording areas 2a of the magnetic disks 2.

More specifically, the electrolytic capacitor 31 is connected to a power supply input terminal 34 through a first switch 32 and a resistor 33 which are parallel to each other. The first switch 32 is a single-pole double-throw changeover switch having a movable contact 32a connected to the access motor 14, a first fixed contact 32b connected to the power supply input terminal 34, and a second fixed contact 32c connected to the electrolytic capacitor 31. When the first switch 32 connects the power supply input terminal 34 and the access motor 14, i.e, the power supply is turned on, the electrolytic capacitor 31 is charged through the resistor 33.

When the power supply is switched off, i.e., the first switch 32 is shifted to the one-dot-and-dash-line position in FIG. 4, the electrolytic capacitor 31 is discharged through the switch 32 to energize the access motor 14. Therefore, the access motor 14 is energized to move the magnetic heads 1 to the non-recording areas 2a of the magnetic disks 2 when the power supply is turned off.

The capacitance of the electrolytic capacitor 31 should be large enough to enable the access motor 14 to drive the magnetic heads 1 toward the non-recording areas 2a.

The auxiliary head driver 3 also has a second switch 35 interlinked with the first switch 32 so that the second switch 35 is opened when the power supply is turned off. While the power supply is turned on, the current from the power supply input terminal 34 is supplied to the motor 14 through the first switch 32 and also to the solenoid 42 through the first and second switches 32, 35. When the power supply is turned off, the second switch 35 is opened in ganged relation to the first switch 32 to allow the head locking mechainsm 4 to be actuated under the resiliency of the compression coil spring 46.

Operation of the disk drive unit is as follows: At the same time that the power supply is turned off, the solenoid 42 is de-energized to permit the locking prong 45 to be pressed against the outer circumferential edge of the scale 41 under the force of the compression coil spring 46. When the electrolytic capacitor 31 is discharged, the access motor 14 is energized to move the magnetic heads 1 toward the non-recording areas 2a of the magnetic disks 2. During this time, the scale 41 is rotated counterclockwise (FIG. 3) without being locked by the locking prong 45. Upon arrival of the magnetic heads 1 at the non-recording areas 2a, the access motor 14 is de-energized, and the locking prong 45 enters the recess 44 to lock the magnetic heads 1 against movement radially over the magnetic disks 2.

Inasmuch as the magnetic heads 1 are locked over the non-recording areas 2a, the recording areas 2b of the magnetic disks 2 are protected against damage even if the magnetic heads 1 are caused to hit the magnetic disks 2 due to vibration of the disk drive unit or shock imposed thereon.

Figure 5:
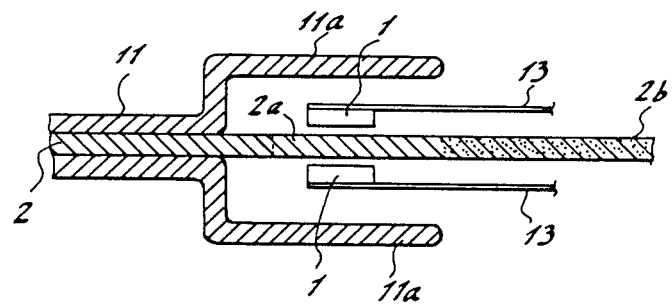
FIG. 5 is an enlarged cross-sectional view taken along line V—V of FIG. 2.

As shown in FIG. 5, each disk holder 11 has a pair of spaced flanges 11a, 11a extending in overhanging and underhanging relation to the non-recording area 2a. The magnetic heads 1, 1 as they are located over the non-recording area 2a are limited by the flanges 11a, 11a in their flexing movement away from the non-recording area 2a perpendicularly to the radial direction of the magnetic disk 2. Therefore, the magnetic heads 1, 1 are prevented from hitting the non-recording area 2a strongly with large inertial forces, with the results that the surfaces of the magnetic disk 1 will not be severely damaged by the magnetic heads 1, 1 and the magnetic heads 1, 1 will be protected against severe damage.

Although a certain preferred embodiment of the present invention has been shown and described in detail, it should be understood that various changes and modifications may be made therein without departing from the scope of the appended claims.

We claim:

1. A disk drive unit comprising:
   (a) a read/write head for recording signals on and reproducing signals from an information storage disk;
   (b) a motor for driving said read/write head in the radial direction of the information storage disk;
   (c) a power supply for energizing said motor;
   (d) first means responsive to turning-off of said power supply for enabling said motor to drive said read/write head radially toward a non-recording area of said information storage disk; and
   (e) second means responsive to turning-off of said power supply for locking said read/write head having reached said non-recording area;
   wherein said second means comprises a circular member connected to the rotatable shaft of said motor and having a recess defined in an outer circumferential edge, a pivotally supported locking lever supporting a locking prong engageable with said recess, a solenoid having a plunger coupled to said locking lever and energizable by said power supply for moving said locking lever to retract said locking prong out of said recess, and a spring normally urging said locking lever in a direction to cause said locking prong to engage in said recess.

2. A disk drive unit comprising:
   (a) a read/write head for recording signals on and reproducing signals from an information storage disk;

(b) a motor for driving said read/write head in the radial direction of the information storage disk;
(c) a power supply for energizing said motor;
(d) first means responsive to turning-off of said power supply for enabling said motor to drive said read/write head radially toward a non-recording area of said information storage disk; and
(e) second means responsive to turning-off of said power supply for locking said read/write head having reached said non-recording area;

wherein said first means comprises a first switch having a movable contact connected to said motor, a first fixed contact connected to said power supply and a second fixed contact, and an electrolytic capacitor connected to said second fixed contact, and a resistor connected between said movable contact and said electrolytic capacitor, whereby when said movable contact is connected to said first fixed contact, said motor is energized by said power supply, and when said movable contact is connected to said second fixed contact, and wherein said second means comprises a circular member connected to the rotatable shaft of said motor and having a recess defined in an outer circumferential edge, a pivotally supported locking lever supporting a locking prong engageable with said recess, a second switch interlinked with said first switch and openable in response to connection of said movable contact to said second fixed contact, a solenoid having a plunger coupled to said locking lever and energizable through said second switch by said power supply for moving said locking lever to retract said locking prong out of said recess, and a spring normally urging said locking lever in a direction to cause said locking prong to engage in said recess.

3. A disk drive unit comprising:
(a) a read/write head for recording signals on and reproducing signals from an information storage disk;
(b) a motor for driving said read/write head in the radial direction of the information storage disk;
(c) a power supply for energizing said motor;
(d) first means responsive to turning-off said power supply for enabling said motor to drive said read/write head radially toward a non-recording area of said information storage disk; and
(e) second means responsive to turning-off of said power supply for locking said read/write head having reached said non-recording area; and
(f) a disk holder for holding said information storage disk, said disk holder having a flange overhanging said non-recording area for limiting movement of said read/write head in a direction away from said non-recording area substantially perpendicularly to said radial direction.

* * * * *